Jan. 24, 1939.  R. H. BOOK  2,144,961
HARROW CONSTRUCTION
Filed Feb. 11, 1938

Inventor
Raymond H. Book
By
Atty.

Patented Jan. 24, 1939

2,144,961

UNITED STATES PATENT OFFICE 2,144,961

HARROW CONSTRUCTION

Raymond H. Book, Rock Falls, Ill., assignor to International Harvester Company, a corporation of New Jersey Application February 11, 1938, Serial No. 189,928

16 Claims. (Cl. 55—83)

This invention relates to a harrow construction. More specifically it relates to a tandem disk harrow construction in which either joint or separate adjustment of the front and rear gangs is made possible.

In the patent to Mowry et al. 1,725,409, dated August 20, 1929, there is shown a tandem harrow construction with such arrangement of frames and gangs that turns may be made without difficulty. In this construction, however, the front and rear gangs must be angled together and this joint angling is effected through a direct connection of the angled ends of the front gangs with the rear frame. Since it is often desirable to angle the front and rear gangs separately, there still remains the problem of devising a tandem harrow in which separate adjustment of front and rear gangs may take place and which also may be turned without difficulty.

The primary object of the invention is, therefore, to provide a harrow construction which may be turned easily and yet allows separate angling of the gangs.

A further object is the provision of a harrow construction which permits separate or joint adjustment of front and rear gangs.

Another object is to provide a harrow in which the joint and separate angling of the gangs is effected from one point on the harrow.

A further object is the provision of a harrow construction which may be turned easily and allows separate or joint angling of the gangs by a unitary means.

Another object is the provision of a superstructure on the front frame of a tandem harrow which carries the mechanism for adjusting the gangs.

Still another object is to provide a superstructure on the front frame of a tandem harrow which receives, for the purpose of adjustment of the rear gangs, an extension of the rear frame.

Other objects will appear from the disclosure.

According to the present invention, a tandem harrow is provided having a front frame, front gangs connected thereto at their outer ends, rear gangs connected at their inner ends to the outer ends of the front gangs by means of links, and a rear frame connected to the outer ends of the rear gangs. The rear frame has an extension projecting over the inner ends of front gangs which is received in a sliding connection by a superstructure pivotally mounted on the front frame. The superstructure carries adjusting devices which connect to the inner ends of the front gangs for adjustment thereof and to the extension of the rear frame for adjustment of the rear gangs.

Figure 1:
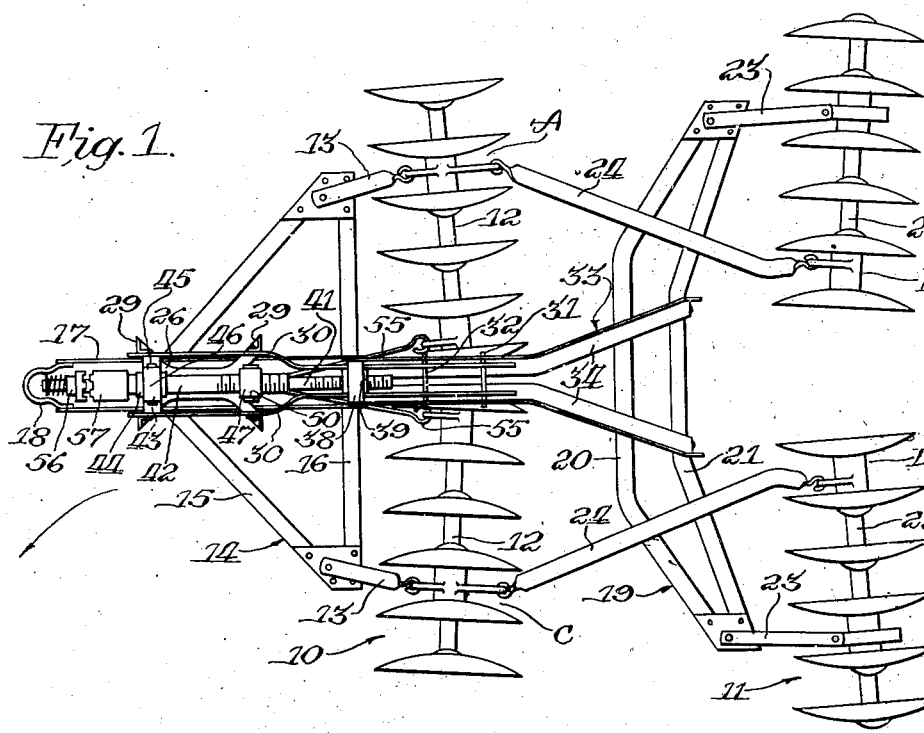
Figure 1 shows a plan view of the novel harrow construction.
Figure 2:
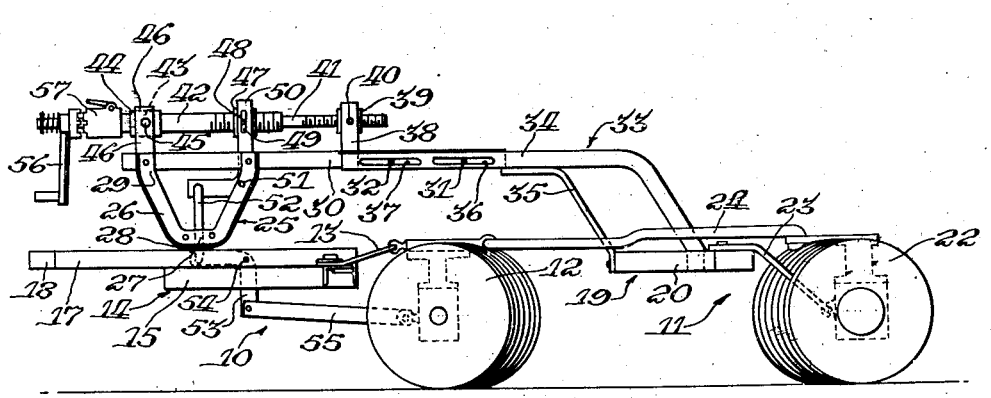
Figure 2 shows a side elevation of the same.

The figures show a tandem disk harrow composed of a front unit 10 and a rear unit 11. The front unit comprises a pair of front gangs 12 connected near their outer ends by means of short links 13 to a front frame 14 formed of a bowed member 15, a straight member 16 extending between the ends of the bowed member, and a pair of spaced parallel longitudinal members 17 connecting midpoints of the member 15 and 16 and receiving between their ends forwardly of the bowed member 15 a draft clevis 18 for connection to a tractor, not shown. The rear unit comprises a rear frame 9 formed of a pair of bowed members 20 and 21 connected at their ends, and a pair of rear gangs 22 connected adjacent their outer ends to the rear frame by means of links 23. Long links 24 connect the inner ends of the rear gangs 22 and the front gangs 12 at points adjacent the points of connection of the short links 13.

A superstructure 25 is mounted on top of the members 17 and is composed of a pair of members 26 formed of angle irons and so shaped that they are joined in a central bearing portion 27 on a bearing plate 28 and extend outwardly and upwardly from the central bearing portion in arms 29. To the inner side of the arms 29 is attached a pair of members 30. These members are parallel over the sections between the arms, and converge rearwardly beyond the arms and then extend in parallel relation rearwardly over the front gangs. Pins 31 and 32 extend between the parallel portions over the gangs.

The rear frame 19 has an extension 33 projecting forwardly over the front gangs. This extension is composed of a pair of members 34 formed of angle irons attached to the member 21 of the rear frame and of a pair of braces 35 extending from the member 20 of the rear frame to the members 34. Members 34 are slotted as at 36 and 37 to receive the ends of the pins 31 and 32. Thus, it will be seen that the superstructure 25, and more particularly the members 30 receive the extension 33 of the rear frame 17 in a sliding connection. A U-shaped member 38 has its ends attached between the forward ends of the members 34 and extends upwardly therefrom.

A nut 39 is held within the U-shaped member by means of projections 40 in recesses in the U-shaped member and is carried on a threaded section of a bolt 41. The bolt is carried within a sleeve 42, which is, in turn, carried by a trunnion 43 fixed against longitudinal movement thereon by means of set collars 44. The trunnion has projections 45 which rest in recesses of a U-shaped member 46, the ends of which are held between the members 30 at their points of juncture with the forward pair of arms 29. The threaded section of the sleeve 42 carries a nut 47 having projections 48 fitting within slots 49, of a generally U-shaped member 50. This member has its ends bent at right angles to the remainder of the member so that it is, in effect, a bell crank, and is pivoted between the rear pair of arms 29 at 51. The bent ends of the member 50 are connected to a link 52 which extends downwardly through an opening in the bearing portion 27 and the bearing plate 28 and is connected with one arm of a bell crank 53. This bell crank is pivoted between the members 17 at 54 and has its other arm connected to links 55 extending to the inner ends of the front gangs 15.

From the foregoing description, it will be apparent that the rear gangs 22 are connected to the bolt 41 by means of the rear frame 19, the extension 33 from the rear frame, the U-shaped member 38 and the nut 39. Consequently, a turn of the bolt 41 will produce a movement of the nut 39 therealong and a resultant shifting of the rear frame 19 and movement of the outer ends of the rear gangs 22. It is also apparent that the sleeve 42 is connected with the inner ends of the front gangs 12 by means of the nut 47, U-shaped member 50, link 52, bell crank 53 and links 55. A turn of the sleeve causes a movement of the nut 47 and a consequent shifting of the inner ends of the gangs 12. Rotation of the sleeve and the bolt is effected by means of a crank 56 mounted on the bolt and having a clutching section selectively engageable with either a clutching collar 57 carried by the sleeve or a clutching collar, not shown, carried by the bolt, or both of the clutching collars. The details of this construction are shown and claimed in applicant's copending application, Serial No. 189,927, filed Feb. 11, 1938, herewith. It is sufficient to state that the clutching collar 57 in the sleeve 42 may occupy any one of three positions longitudinally of the sleeve and thus allow the crank 56 to clutch either the bolt and/or the sleeve. In this way, separate adjustment of either the front gangs or the rear gangs, or simultaneous adjustment of both sets of gangs is made possible.

In operation, angling of the front gangs is effected by movement of the inner ends thereof, the outer ends being relatively fixed to the front frame. The rear gangs are angled by movement of the rear frame which in turn moves the outer ends of the rear gangs. The inner ends of the rear gangs are relatively fixed since they are connected by means of the links 22 to the outer ends of the front gangs adjacent their points of connection with the front frame.

Let it be assumed that a turn is to be made in the direction of the arrow shown near the forward end of the harrow. The point A adjacent the outer end of one of the front gangs 15 will move forward and tend to pull forward the inner end of one of the rear gangs 20, as at B, by means of the link 24, and thus bring the gang 20 into a line generally on the radius of the turn. The point C adjacent the outer end of the other of the front gangs 15 moves back in opposite direction to the point A and the point D on the gang 20 also moves back so that this gang also moves into a line generally on a radius of the turn. Thus turning is facilitated.

The intention is to limit the claims only within the spirit and scope of the appended claims.

What is claimed is:

1. A harrow construction comprising a front frame, a pair of front gangs connected adjacent their outer ends to the front frame, a pair of rear gangs located in spaced relation to the pair of front gangs, connections extending from the front frame to the inner ends of the rear gangs, a rear frame connected adjacent the outer ends of the rear gangs and having an extension over the inner ends of the front gangs, a superstructure pivotally mounted on the front frame and receiving the extension of the rear frame in a sliding connection, a bolt rotatably mounted on the superstructure, a nut carried by the bolt and connected with the extension of the rear frame, a rotatable sleeve surrounding the bolt, a nut carried by the sleeve, links connecting the nut and the inner ends of the front gangs, and a crank rotatably supported by the bolt and capable of operative connection with the sleeve and/or the bolt for adjustment of the front gangs and/or the rear gangs.

2. A harrow construction comprising a front frame, a pair of front gangs connected adjacent their outer ends to the front frame, a pair of rear gangs located in spaced relation to the pair of front gangs, connections extending from the front frame to the inner ends of the rear gangs, a rear frame connected adjacent the outer ends of the rear gangs and having an extension over the inner ends of the front gangs, a superstructure pivotally mounted on the front frame and receiving the extension of the rear frame in a sliding connection, a first adjusting means mounted on the superstructure and connected with the inner ends of the front gangs, a second adjusting means mounted on the superstructure and connected with the extension of the rear frame, and an actuation member selectively engageable with either or both of the adjusting means for joint or separate adjustment of the front and rear gangs.

3. A harrow construction comprising a front frame, a pair of front gangs connected adjacent their outer ends to the front frame, a pair of rear gangs located in spaced relation to the pair of front gangs, connections extending from the front frame to the inner ends of the rear gangs, a rear frame connected adjacent the outer ends of the rear gangs and having an extension over the inner ends of the front gangs, a superstructure pivotally mounted on the front frame and receiving the extension of the rear frame in a sliding connection, a first adjusting device mounted on the superstructure and connected with the inner ends of the front gangs, and a second adjusting device connected with the extension of the rear frame.

4. A harrow construction comprising a front frame, a pair of front gangs connected adjacent their outer ends to the front frame, a pair of rear gangs located in spaced relation to the pair of front gangs, connections extending from the front frame to the inner ends of the rear gangs, a rear frame connected adjacent the outer ends of the rear gangs and having an extension over the inner ends of the front gangs, a superstructure pivotally mounted on the front frame and receiving the extension of the rear frame in a sliding connection, a first adjusting device mounted on the superstructure and connected with the inner ends of the front gangs, a second adjusting device connected with the extension of the rear frame, and an actuating member selectively engageable with either adjusting device for separate adjustment of the front gangs and the rear gangs.

5. A harrow construction comprising a front frame, a pair of front gangs connected thereto, a pair of rear gangs connected to the front frame in spaced relation thereto, a rear frame connected to the rear gangs and having an extension over the front gangs, a superstructure pivotally mounted on the front frame and receiving the extension of the rear frame in a sliding connection, a first adjusting device mounted on the superstructure and connected with the front gangs for adjustment thereof, and a second adjusting device also mounted on the superstructure and connected with the extension of the rear frame adjustment of the rear gangs.

6. A harrow construction comprising a front frame, a pair of front gangs connected thereto, a pair of rear gangs connected to the front frame in spaced relation thereto, a rear frame connected to the rear gangs and having an extension over the front gangs, a superstructure pivotally mounted on the front frame and receiving the extension of the rear frame in a sliding connection, a first adjusting device connected with the front gangs for adjustment thereof, and a second adjusting device connected with the extension of the rear frame for adjustment of the rear gangs.

7. A harrow construction comprising a front frame, a pair of front gangs connected thereto, a pair of rear gangs connected to the front frame in spaced relation thereto, a rear frame connected to the rear gangs and having an extension over the front gangs, a superstructure pivotally mounted on the front frame and receiving the extension of the rear frame in a sliding connection, a first adjusting device mounted on the superstructure and connected with the front gangs for adjustment thereof, and a second adjusting device mounted within the first adjusting device and connected with the extension of the rear frame for adjustment of the rear gangs.

8. A harrow construction comprising a front frame, a pair of front gangs connected thereto, a pair of rear gangs connected to the front frame in spaced relation thereto, a rear frame connected to the rear gangs and having an extension over the front gangs, a superstructure pivotally mounted on the front frame and receiving the extension of the rear frame in a sliding connection, an adjusting means connected with the front gangs for adjustment thereof and with the extension of the rear frame for adjustment of the rear gangs.

9. A harrow construction comprising a front frame, a pair of front gangs connected thereto, a pair of rear gangs connected to the front frame in spaced relation thereto, a rear frame connected to the rear gangs, and adjusting means connected with the front gangs for adjustment thereof and through a separate connection with the rear frame for producing relative movement between the frames and consequent adjustment of the rear gangs.

10. A harrow construction comprising a front frame, a pair of front gangs connected thereto, a pair of rear gangs connected to the front frame in spaced relation thereto, a rear frame connected with the rear gangs, a superstructure pivotally mounted on the front frame, and adjusting means carried by the superstructure and connected with the front gangs for adjustment thereof and with the rear frame for producing relative movement between the rear frame and the superstructure and consequent adjustment of the rear gangs.

11. A harrow construction comprising a front frame, a pair of front gangs connected thereto, a pair of rear gangs connected to said front frame in spaced relation thereto, a rear frame connected to the rear gangs, a first adjusting device connected with the front gangs for adjustment thereof, and a second adjusting device connected with the rear frame for producing relative movement between the front and rear frames and consequent adjustment of the rear gangs.

12. A harrow construction comprising a front frame, a pair of front gangs connected thereto, a pair of rear gangs connected to said front frame in spaced relation thereto, a rear frame connected to the rear gangs, a superstructure pivotally mounted on the front frame, a first adjusting device mounted on the superstructure and connected with the front gangs, and a second adjusting device mounted on the superstructure and connected with the rear frame for producing relative movement between the superstructure and the rear frame and consequent adjustment of the rear gangs.

13. A harrow construction comprising a first frame, a first pair of gangs connected with said frame adjacent their outer ends, a second pair of gangs spaced from said first pair, connections extend between the inner ends of said second pair and the first frame, a second frame connected to the outer ends of the first pair of gangs and having an extension projecting over the first pair of gangs, a superstructure pivotally mounted on the first frame and receiving the extension of the second frame in a sliding connection, a first rotatably mounted adjusting device on the superstructure connected to the inner ends of the first pair of gangs, a second rotatably mounted adjusting device on the superstructure connected to the extension of the second frame, and an actuating member selectively engageable with either adjusting device separately for separate rotation of the device and consequent separate adjustment of each pair of gangs.

14. A harrow construction comprising a first frame, a first pair of gangs connected adjacent one end of the first frame, a second pair of gangs spaced from the first pair, connections extending between the inner ends of the second pair of gangs and the first frame, a second frame connected adjacent the outer ends of the second pair of gangs and having an extension projecting over the first pair of gangs, a superstructure pivotally mounted on the first frame and receiving the extension of the second frame in a sliding connection, coaxially mounted rotatable adjusting devices on the superstructure connected to the first pair of gangs at points spaced from their points of connection to the first frame and to the extension of the second frame, and an actuating member coaxially mounted with respect to the adjusting devices and engageable selectively with either of the adjusting devices separately for separate adjustment of the first and second pairs of gangs.

15. A harrow construction comprising a front frame, a pair of front gangs connected adjacent their outer ends to the front frame, a pair of rear gangs located in spaced relation to the pair of front gangs, connections extending from the front frame to the inner ends of the rear gangs, a rear frame connected adjacent the outer ends of the rear gangs and having an extension over the inner ends of the front gangs, a superstructure comprising a central bearing portion in pivotal contact with the front frame and arms extending radially and upwardly away from the bearing portion, and a pair of substantially spaced parallel members carried by the arms and receiving the extension of the rear frame in a sliding connection, and a pair of adjusting devices mounted on the superstructure and connected to the inner ends of the front gangs and the extension of the rear frame.

16. A harrow construction comprising a front frame, a pair of front gangs connected adjacent their outer ends to the front frame, a pair of rear gangs located in spaced relation to the pair of front gangs, connections extending from the front frame to the inner ends of the rear gangs, a rear frame connected to the outer ends of the rear gangs and having an extension over the inner ends of the front gangs, a superstructure comprising a central bearing portion in pivotal contact with the front frame and arms extending radially and upwardly away from the bearing portion, and a pair of substantially spaced parallel members carried by the arms and receiving the extensilon of the rear frame in a sliding connection, a threaded sleeve mounted on the superstructure, a nut on the sleeve, connecting means between the nut and the inner ends of the front gangs extending through the bearing portion of the superstructure, a threaded bolt carried within the sleeve, a nut carried by the bolt and connected with the extension of the rear frame, and an actuating member selectively engageable with the sleeve and or the bolt for separate or joint adjustment of the front and rear harrow gangs.

RAYMOND H. BOOK.